United States Patent [19]

Hilsum

[11] Patent Number: 4,630,115
[45] Date of Patent: Dec. 16, 1986

[54] CATHODE RAY TUBE DISPLAY DEVICE
[75] Inventor: Cyril Hilsum, Middlesex, England
[73] Assignee: The General Electric Company, p.l.c., England
[21] Appl. No.: 681,994
[22] PCT Filed: May 9, 1984
[86] PCT No.: PCT/GB84/00156
  § 371 Date: Dec. 10, 1984
  § 102(e) Date: Dec. 10, 1984
[87] PCT Pub. No.: WO84/04642
  PCT Pub. Date: Nov. 22, 1984
[30] Foreign Application Priority Data
  May 9, 1983 [GB] United Kingdom ............... 8312732
[51] Int. Cl.⁴ ............................................. H04N 17/00
[52] U.S. Cl. ..................................... 358/139; 358/242; 315/370
[58] Field of Search ............... 358/242, 243, 245, 180, 358/64, 67, 10, 69, 70, 139; 315/371, 370, 387, 10, 8, 21; 313/421

[56] References Cited
U.S. PATENT DOCUMENTS

| | | | |
|---|---|---|---|
| 3,743,883 | 7/1973 | Burns | 315/21 |
| 4,142,132 | 2/1979 | Harte | 315/370 |
| 4,159,484 | 7/1979 | Strathman | 358/67 |
| 4,234,893 | 11/1980 | Peters | 358/180 |
| 4,441,120 | 4/1984 | Gerritsen | 358/10 |
| 4,456,853 | 6/1984 | Robinder et al. | 315/387 X |

FOREIGN PATENT DOCUMENTS

| | | |
|---|---|---|
| 1368539 | 9/1974 | United Kingdom . |
| 2011765 | 7/1979 | United Kingdom . |
| 1588652 | 4/1981 | United Kingdom . |
| 2072453 | 9/1981 | United Kingdom . |
| 2102258 | 1/1983 | United Kingdom . |

Primary Examiner—Howard W. Britton
Assistant Examiner—Victor R. Kostak
Attorney, Agent, or Firm—Kirschstein, Kirschstein, Ottinger & Israel

[57] ABSTRACT

A display device which is corrected for vibration, for example between screen (4) and the electron gun (2) in a C.R.T. (1). The device comprises an optical system (6) on the observer side of the screen (4) for directing the light from a small part of the screen (9), onto which the electron beam is directed at intervals, onto a photocell (10) which detects the position of the light spot. The output signal from the photocell is processed in a circuit (5) to provide a correction signal which is applied to the deflection system (3) of the C.R.T. to reduce the deviation of the light spot from the position it would have in a vibration-free environment.

9 Claims, 4 Drawing Figures

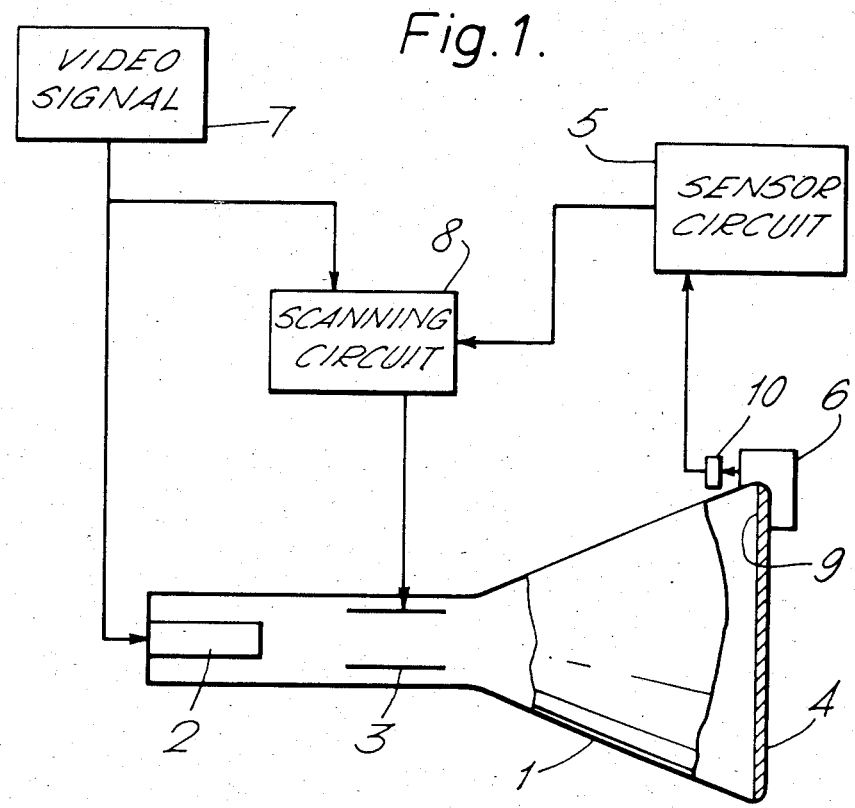
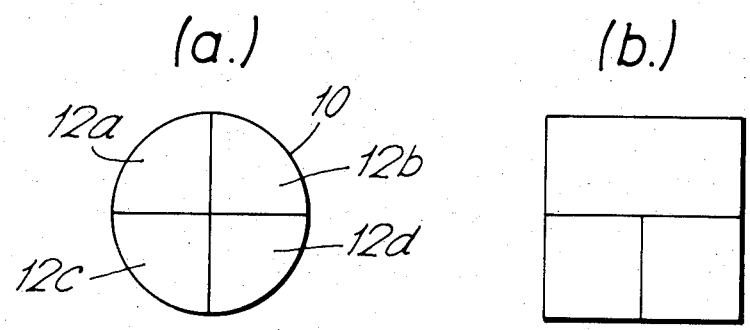

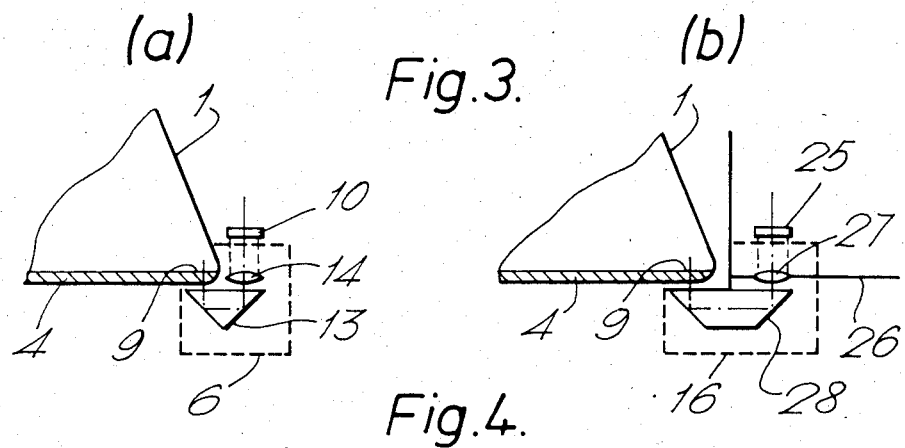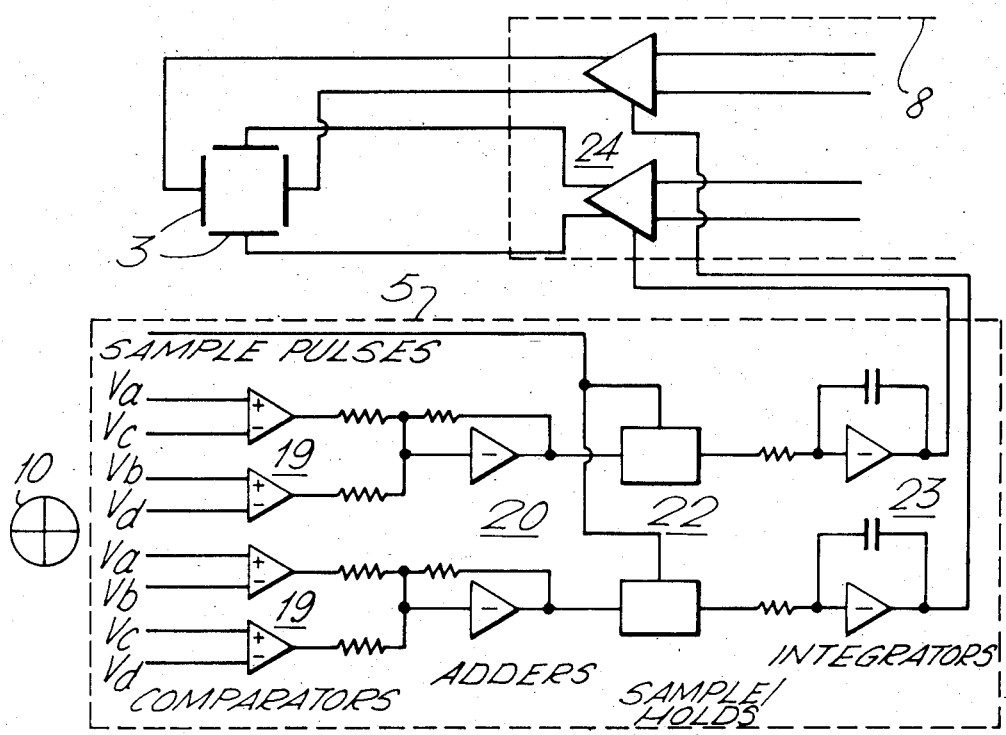

CATHODE RAY TUBE DISPLAY DEVICE

This invention relates to cathode ray tube display devices, more especially cathode ray tube display devices suitable for operation under vibration, for example in an aircraft or tank.

A cathode ray tube (CRT) comprises at least one electron gun for producing a beam of electrons, a luminescent screen and means for deflecting the beam of electrons across the screen. When such a tube is exposed to vibration, relative movement of the component parts of the tube leads to image distortion. The remedy used at present takes one of two forms. The tube can be especially strengthened to resist vibration, e.g. so that the gun position always remains fixed with respect to the screen, or the tube can be mounted in a vibration-proof mount. Both solutions are expensive and they are not cures for all conditions.

An alternative solution to this problem is to provide a cathode ray tube display device comprising: a cathode ray tube including electron gun means; means for periodically operating the tube to direct a beam of electrons produced by the electron gun means onto a target; sensor means for producing an output signal representing the deviation of the position of impact of the beam on the target from a desired position; and means for utilising said output signal to reduce said deviation.

It is an object of the present invention to provide a practical form of such a cathode ray tube display device.

Accordingly, the present invention provides a cathode ray tube (CRT) display device comprising a cathode ray tube including electron gun means, control means for periodically operating the CRT to direct a beam of electrons produced by the electron gun means onto a target, sensor means for producing an output signal dependent on the deviation of the position of impact of the beam on the target from a desired position on the target and correction means for utilising said output signal to reduce said deviation, characterised in that said sensor means comprises: sensing means responsive to the position of impact of the electron beam on the target; first circuit means responsive to the output of said sensing means to produce an output indicative of the direction of the deviation of said position of impact from said desired position; storage means for storing said output of said first means; and second circuit means for integrating said stored output to produce said output signal.

In a preferred arrangement in accordance with the invention said output of said first circuit means comprises two components each representative of said deviation from said desired position in a different one of two orthogonal directions.

In one such preferred arrangement the sensing means comprises four sensing areas extending in different directions from a position defining said desired position, each said area subtending an angle of substantially 90° at said desired position, and said first circuit means comprises comparator means responsive to signals $V_a$, $V_b$, $V_c$ $V_d$ respectively produced by said four sensing areas on impact of the electron beam to produce output signals $V_a-V_b$, $V_c-V_d$, $V_a-V_c$ and $V_b-V_d$ and adder means for adding said comparator means output signals to produce outputs $(V_a-V_b)+(V_c-V_a)$ and $(V_a-V_c)+(V_b-V_d)$.

One cathode ray tube display device in accordance with the invention will now be described by way of example with reference to one accompanying drawings in which:

FIG. 1 is a schematic diagram of the device;

FIGS. 2(a) and 2(b) show diagrammatically two possible forms of a sensing means used in the device;

FIGS. 3(a) and 3(b) illustrate two possible forms of an optical system associated with the sensing means; and FIG. 4 is a block schematic diagram of a sensor and correction circuit used in the device.

FIG. 1 shows a cathode ray tube 1 comprising an electron gun 2, deflection plates 3 and a luminescent screen 4. The synchronising part of a video signal 7 of raster-scan format coming from, for example, a television broadcast receiver or a radar equipment (not shown) is utilised to control the operation of the scanning circuit 8. The video part of the signal 7 is fed to the electron gun 2 to modulate the intensity of the beam.

At suitable intervals in the scanning sequence, as hereinafter further described, the electron beam is directed, for a short period, onto an edge portion 9 of the screen 4 and the light spot produced on the portion 9 of the screen by the beam is directed by means of an optical system 6 onto a light sensing means in the form of a photocell 10.

The output of the photocell 10 is utilised by a sensor circuit 5 to produce a deflection correction signal to compensate for relative movement between the electron gun and the screen of the CRT in operation.

The photocell 10 is divided into quadrants 12a, 12b, 12c and 12d, as shown in FIG. 2(a), each of which is a photovoltaic detector with a transparent surface electrode facing the incoming light. The boundaries between the four detectors are slightly narrower than the diameter of the light spot so that the spot is always detectable by at least one of the detectors 12a–d. The detectors 12a–d produce output voltages $V_a$, $V_b$, $V_c$ and $V_d$ respectively which are either zero if the spot is not detected or positive if it is detected. Hence the voltages can be used to indicate horizontal and vertical deviations of the position of the spot.

An indication of vertical deviation of the spot can be obtained from the voltage sum $$V_v=(V_a-V_c)+(V_b-V_d)$$

which will be positive if the spot is above the centre line, zero if it is on the centre line (since the upper and lower detectors will be detecting the spot) and negative if it is below the centre line. An indication of horizontal deviation can be obtained in a similar manner using the voltage sum $$V_h=(V_a-V_b)+(V_c-V_d)$$

If the spot is on the exact centre of the photocell, all the detectors will have an output and so the voltage sums $V_v$ and $V_h$ will be zero.

As shown in FIG. 3(a), the optical system 6 consists of a 90° prism 13 which reflects the light through 180° and a lens 14 to ensure that the light spot is focussed on the photocell 10. The optical system 6 and the photocell 10 are located in such a way that when the device is being used in a vibration free environment and voltages $V_x°$ and $V_y°$ are being applied to the deflection plates, the light spot falls on the exact centre of the photocell. In this case, of course, no correction is required.

When the device is being used in a vibrating environment, during each of the above mentioned periods when the electron beam is directed onto the edge portion 9 of the screen 4, the voltage sums $V_v$ and $V_h$ are sampled and utilised to produce appropriate deflection correction voltages if the light spot is found to be displaced from the centre of the photocell.

Referring now to FIG. 4, the sensor circuit 5 includes four comparators 19 to which the photocell output voltages $V_a$, $V_b$, $V_c$ and $V_d$ are applied, and two adder circuits 20 arranged to produce signals corresponding to the sum voltages $V_v$ and $V_h$ at their outputs respectively. Each of the adders produces an output of zero or V volts of one polarity or the other so that the adder outputs are effectively digital signals. The outputs of the adders 20 are sampled in sample and hold circuits 22 during each period when the electron beam is directed onto the edge portion 9 of CRT screen 4, and the outputs of the circuits 22 are integrated by the integrators 23 to produce the required deflection correction signals. These correction voltages are then combined in differential output amplifiers 24 with the normal deflection voltages generated by scanning circuit 8 and applied to the CRT deflection plates 3.

It will be appreciated that the deflection voltages applied to the deflection plates 3 during each sampling period will thus be the voltages $V_x°$ and $V_y°$ generated by the scanning circuit 8 combined with the correction voltages built up over the preceding sampling periods at the outputs of the integrators 23 in the sensor circuit 5.

In general, the frequency of vibration can be as high as 2 kHz and so the corrections must be made at intervals of at most 500 microseconds in order to have at least one correction per vibration cycle. Hence the beam is typically directed onto the edge portion 9 of the screen at least once every 500 microseconds for a short period, e.g. not more than 50 microseconds. In this way a series of unit small corrections is applied, the sampling being so frequent that a large correction is never needed.

Where correction only for relative movement between the electron gun and the CRT screen is required, the optical system 6 and the sensing means 10 will be secured to the CRT envelope, as illustrated in FIG. 3(a).

The invention may also be used, however, to correct in addition for relative movement between the screen and the CRT mounting panel, or between the screen and the observer. One arrangement suitable for use for additionally correcting for relative movement between the screen and the mounting panel is shown in FIG. 3(b) where a sensing means 25 is mounted on the mounting panel 26 where it receives light from an optical system 16 comprising a lens 27 and a prism 28 similarly to the system 6 described above. Additional correction for observer motion relative to the screen can be achieved with convenience by attaching the sensing means to the observer.

Of course the reflection of light by 180° is not necessary and in an alternative arrangement a small planoconvex lens can be connected directly to the outer face of the screen to focus the light spot onto a photocell fixed to the lens at an appropriate distance. Alternatively, if the CRT has a fibre-optic face plate, the light may be coupled to the sensing means through a small number of fibres, or a fibre optic bundle may be cemented to the plate and connected to a sensing means attached to the appropriate reference frame.

Further, the sensing means need not be divided into quadrants, but may, for example, be divided into three portions as shown in FIG. 2(b).

In further alternative arrangements in accordance with the invention, instead of using a sensing means external of the CRT onto which an image of a light spot formed on the CRT screen is directed to detect electron beam position, a sensing means integral with the CRT may be used.

In one such arrangement the target comprises a patch of material on the internal surface of a part of the CRT envelope which emits secondary electrons or whose conductivity changes in response to impact of the electron beam, the sensing means then being responsive to such secondary electron emission or conductivity changes as appropriate. Alternatively the sensing means may be in the form of a photoconductive patch overlaying or underlying a part of the phosphor screen.

Whilst in the device described by way of example small unit corrections of beam position are applied, it will be appreciated that this is not necessarily the case in a device according to the invention. Thus in one alternative arrangement in accordance with the invention if the sensing means detects a deviation of the beam from the desired position in a number of successive sampling periods the correction applied may be increased e.g. to two or three times the usual unit correction. This could be useful for quickly correcting large deviations of beam position such as may arise on first switching on or when there is a sudden large shock.

It will further be understood that whilst in the device described above by way of example a single electron gun cathode ray tube is used, the invention may also be applied to devices using multi-gun cathode ray tubes. Where such a multi-gun tube employs a multi-colour screen, information regarding beam position deviation may be obtained by analysing the colour of the image produced by the beam as well as or in addition to the position of the image.

It will be understood that a device according to the invention may be used to compensate for deviations due to causes other than, or in addition to, vibration e.g. due to stray magnetic fields.

I claim:

1. A cathode ray tube (CRT) display device comprising a cathode ray tube (1) including electron gun means (2), control means (8) for periodically operating the CRT to direct a beam of electrons produced by the electron gun means (2) onto a target (9), sensor means (5,10) for producing an output signal dependent on the deviation of the position of impact of the beam on the target from a desired position on the target and correction means (24) for utilizing said output signal to reduce said deviation, characterized in that said sensor means comprises: sensing means (10) having a plurality of discrete sensing areas each responsive to the impact of said electron beam on a different area of the target; first circuit means (19,20) responsive to the output of said sensing means to produce an output indicative of the direction only of the deviation of said position of impact of said electron beam on said target from said desired position on said target, storage means (22) for storing said output of said first circuit means and second circuit means (23) for integrating said stored output to produce said output signal.

2. A CRT display device according to claim 1 wherein said output of said first circuit means comprises two components each representative of said deviation from said desired position in a different one of two orthogonal directions.

3. A CRT display device according to claim 2 wherein said sensing means comprises four sensing areas extending in different directions from a position defining said desired position, each said area subtending an angle of substantially 90° at said desired position.

4. A CRT display device according to claim 3 wherein said first circuit means comprises comparator means (19) responsive to signals $V_a$, $V_b$, $V_c$, $V_d$ respectively produced by said four sensing areas on impact of the electron beam to produce output signals $V_a-V_b$, $V_c-V_d$, $V_a-V_c$ and $V_b-V_d$ and adder means (20) for adding said comparator means output signals to produce outputs $(V_a-V_b)+(V_c-V_d)$ and $(V_a-V_c)+(V_b-V_d)$.

5. A CRT display device according to claim 1 wherein said correction means (24) comprises differential output amplifier means for combining said output signal of the sensor means with normal deflection signals for said electron beam.

6. A CRT display device according to claim 1 wherein said target (9) is an area of luminescent material on the screen of the CRT and said sensing means (10) comprises photo-electric material (12) and an optical system (6) is provided whereby light produced by impact of the electron beam on said target is directed onto said photo-electric material.

7. A CRT display device according to claim 1 wherein said sensing means (10) is mounted on the CRT.

8. A CRT display device according to claim 1 wherein said sensing means (10) is mounted on a part of a frame within which the CRT is positioned.

9. A CRT display device according to claim 1 wherein said sensing means (10) is mounted on an observer of the CRT display.

* * * * *